United States Patent [19]
Ishikawa et al.

[11] Patent Number: 6,047,986
[45] Date of Patent: Apr. 11, 2000

[54] AIR BAG INFLATOR APPARATUS

[75] Inventors: Masanobu Ishikawa; Kazunori Sakamoto; Yoshiyuki Ito, all of Aichi-pref., Japan

[73] Assignee: Aisin Seiki Kabushiki Kaisha, Aichi-pref., Japan

[21] Appl. No.: 08/917,773

[22] Filed: Aug. 27, 1997

[30] Foreign Application Priority Data

Aug. 29, 1996 [JP] Japan .................................... 8-228995

[51] Int. Cl.[7] .......................... B60R 21/26; B60R 21/20
[52] U.S. Cl. .......................................... 280/740; 280/732
[58] Field of Search .................................. 280/728.2, 732, 280/736, 740, 742, 728.1

[56] References Cited

U.S. PATENT DOCUMENTS

| 5,280,948 | 1/1994 | Henseler et al. |
| 5,332,256 | 7/1994 | Lauritzen et al. ................... 280/728.2 |
| 5,482,313 | 1/1996 | Ikeya et al. ............................. 280/732 |
| 5,544,911 | 8/1996 | Vine . |

FOREIGN PATENT DOCUMENTS

| 558240 | 9/1993 | European Pat. Off. . |
| 4223237 | 1/1994 | Germany . |
| 93/08042 | 4/1993 | WIPO ................................. 280/728.2 |

*Primary Examiner*—Peter C. English
*Attorney, Agent, or Firm*—Hazel & Thomas, P.C.

[57] ABSTRACT

An air bag inflator apparatus incorporating a lower canister and an upper canister forming a canister housing. The canister housing has a first wall, a second wall, a third wall, a fourth wall and a fifth wall. The first, second, third and fourth walls define a first space which accommodates an air bag, and the first, second, third, fourth and fifth walls define a second space which accommodates an inflator. A first flow control wall is continuously formed on the surface of the first wall, and a second flow control wall is continuously formed on the surface of the second wall. The first and second flow control walls control a flow of a gas from the inflator.

4 Claims, 3 Drawing Sheets

AIR BAG INFLATOR APPARATUS

BACKGROUND OF THE INVENTION

1. Field of the Invention

The present invention relates to an air bag apparatus for use in a supplemental restraint system of a vehicle and, more particularly, to an air bag apparatus having an inflator which controls the flow of gas during inflation.

2. Description of the Related Art

An air bag inflator apparatus for a vehicle is disclosed in, for example, U.S. Pat. No. 5,332,256. The air bag apparatus has a canister which defines a first space and a second space. An inflator is arranged in the first space, and an air bag is arranged in the second space. The first space is formed by a diffuser tube. In order to diffuse a gas in the second space, a diffuser slot is formed in the wall of the diffuser tube. However, the above-mentioned air bag apparatus requires a further manufacturing process to make the diffuser slot after having furnished the diffuser tube. This increases the complexity of manufacturing necessary and the resultant cost.

SUMMARY OF THE INVENTION

A need therefore exists for an improved air bag inflator apparatus that overcomes the above-mentioned drawbacks.

It is a primary object of the present invention to provide an air bag inflator apparatus that requires fewer manufacturing processes.

It is another object of the present invention to provide an air bag inflator apparatus that reduces manufacturing costs.

In order to achieve the above-mentioned objects, an air bag inflator apparatus having a lower canister and an upper canister form a canister housing. The lower canister and the upper canister have a first wall, a second wall, a third wall, a fourth wall and a fifth wall. The first, second, third and fourth walls define a first space which accommodates an air bag. The first, second, third, fourth and fifth walls define a second space which accommodates an inflator. A first flow control wall is continuously formed on the surface of the first wall. A second flow control wall is continuously formed on the surface of the second wall. The first and second flow control walls control flow of gas from said inflator.

BRIEF DESCRIPTION OF THE DRAWINGS

Other objects, features and advantages of the present invention will be more readily appreciated from the following description of the preferred embodiments thereof when taken together with the accompanying drawings, in which.

DETAILED DESCRIPTION OF THE PREFERRED EMBODIMENT

Figure 1:
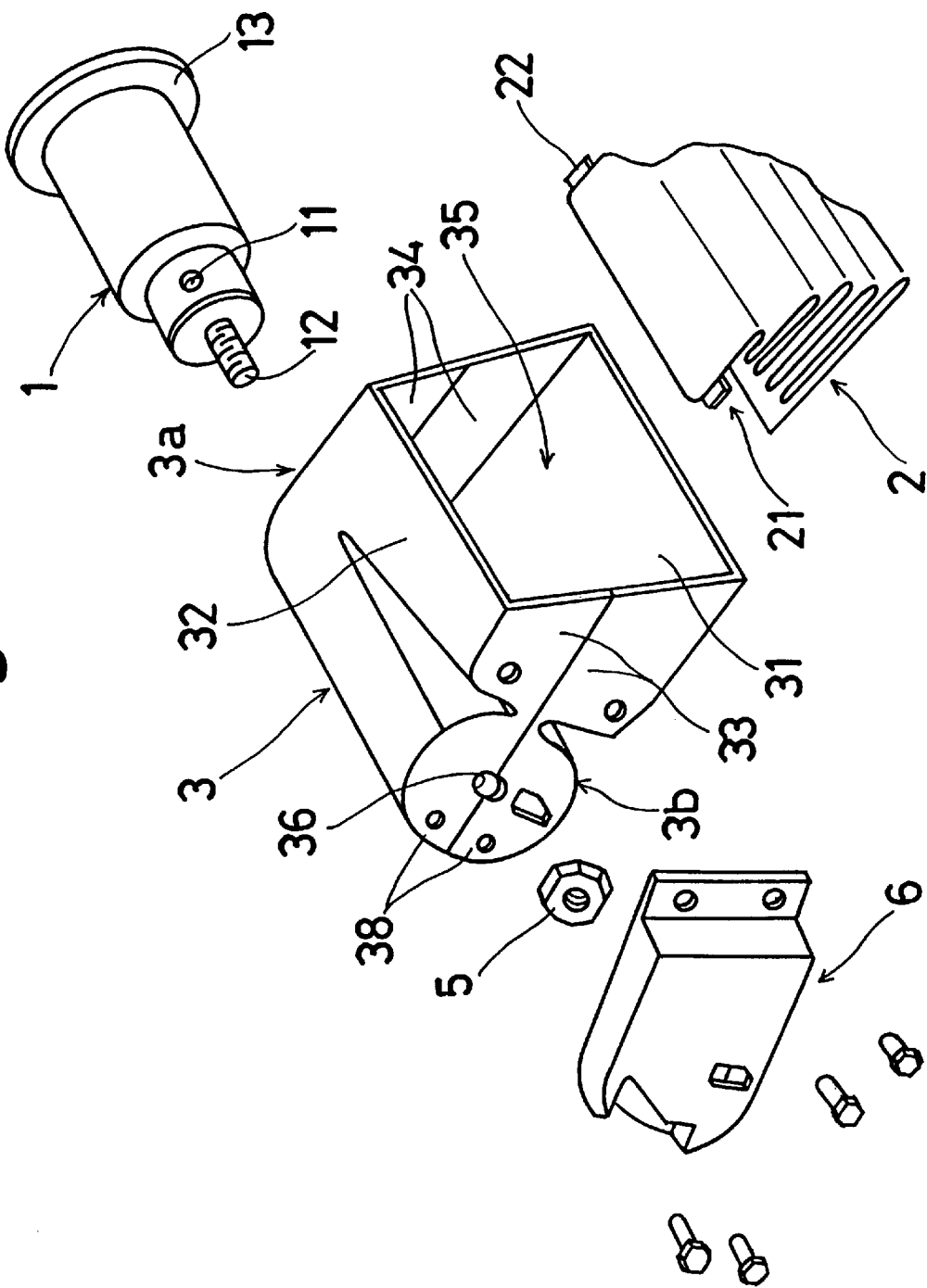
FIG. 1 is an exploded perspective view of the air bag inflator apparatus according to the present invention.

Referring to the drawings, preferred embodiments of the present invention will be explained in detail. An apparatus illustrating features of the present invention is shown in FIG. 1. With reference to FIG. 1, there is shown an air bag inflator exploded view in perspective of an air bag apparatus constructed in accordance with the present invention. The inflator 1 is formed cylindrical and is accommodated by a canister housing 3. The canister housing 3 is composed of an upper canister 3a and a lower canister 3b. An air bag 2 is folded in the canister housing 3. When gas is supplied by the inflator 1 into the air bag 2, the air bag 2 expands from its storage position to protect passengers of a vehicle. The lower canister 3b has a lower wall 31 (first wall), side walls 33, 34 (third and fourth walls) and a bottom wall 38 (fifth wall). Similar to the lower canister 3b, the upper canister 3a has an upper wall 32 (second wall), side walls 33, 34 (third and fourth walls) and the bottom wall 38 (fifth wall). The bottom wall 38 (fifth wall) is arc-shaped. The bottom wall 38 (fifth wall) is continuously formed with the upper wall 32, lower wall 31 and each of the side walls. An opening 35 is provided which faces the bottom wall 38 (fifth wall). The canister housing 3 is fixed to the instrument panel (not shown) through a bracket 4 and the opening 35 faces the direction of the passenger's seat. A first space A and a second space B are established in the canister housing 3. Further, an air path C is established between the first space A and the second space B. The inflator 1 is accommodated in the first space A, and the air bag 2 is accommodated in the second space B. A gas emission opening 11 is formed at one end of the inflator 1. The inflator 1 has a screw 12 and an increased diameter portion 13. The screw 12 is fitted into a hole 36 which is formed on the side wall 33 (third wall) and fixed by a nut 5. The increased diameter portion 13 of the inflator is fitted into a hole 37 which is formed on the side wall 34 (fourth wall). As a result, the inflator 1 is affixed to the canister housing 3 and the gas emission opening 11 is located adjacent the side wall 33 (third wall). The air bag 2 is affixed to the canister housing 3 for maintaining the air-tightness by using a fastener 22. The plate shaped fastener 22 is fixed on the inner surface of the canister housing 3 by a plurality of bolts (not shown).

Figure 2:
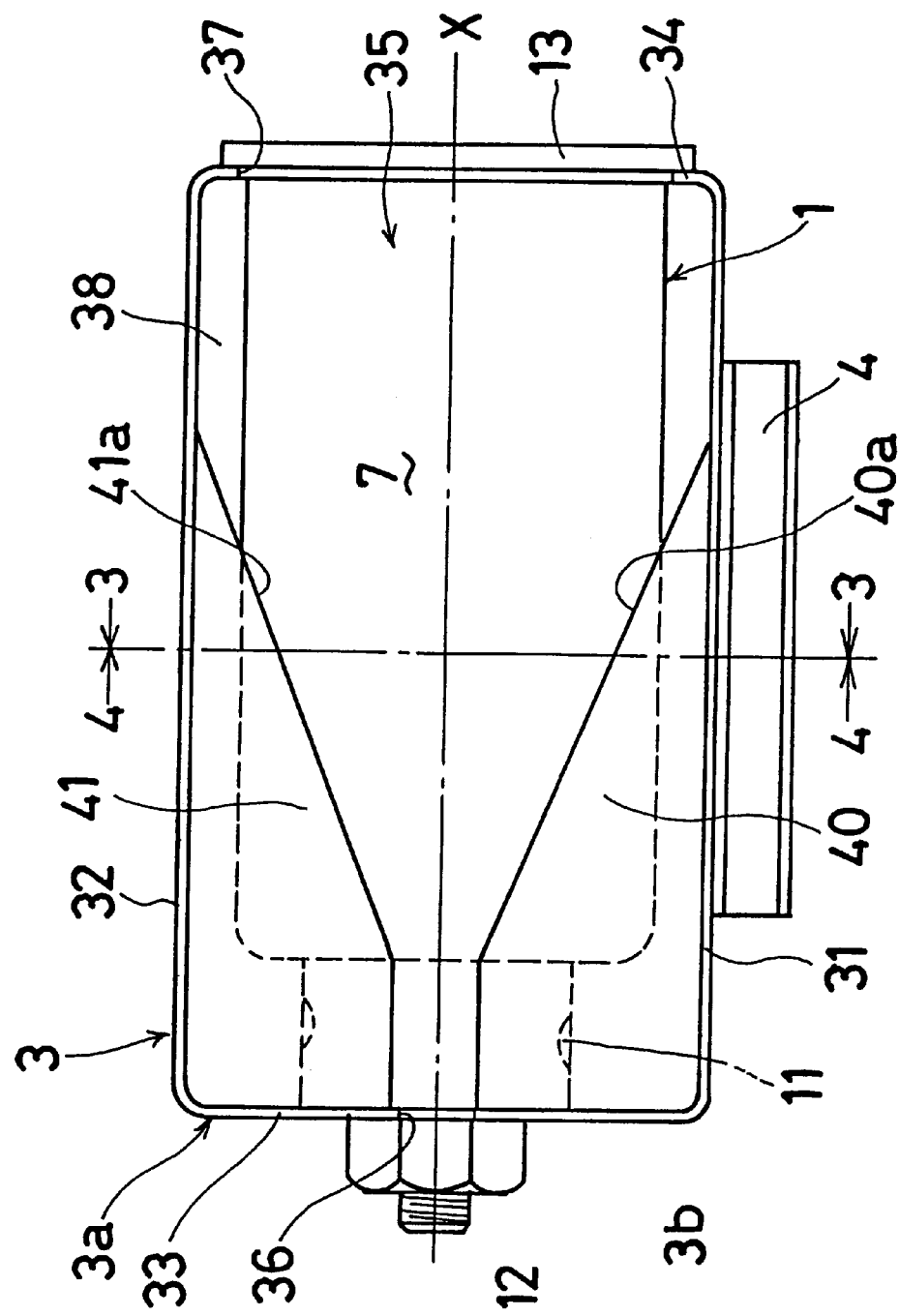
FIG. 2 is a front view of the air bag inflator apparatus according to the present invention.
Figure 3:
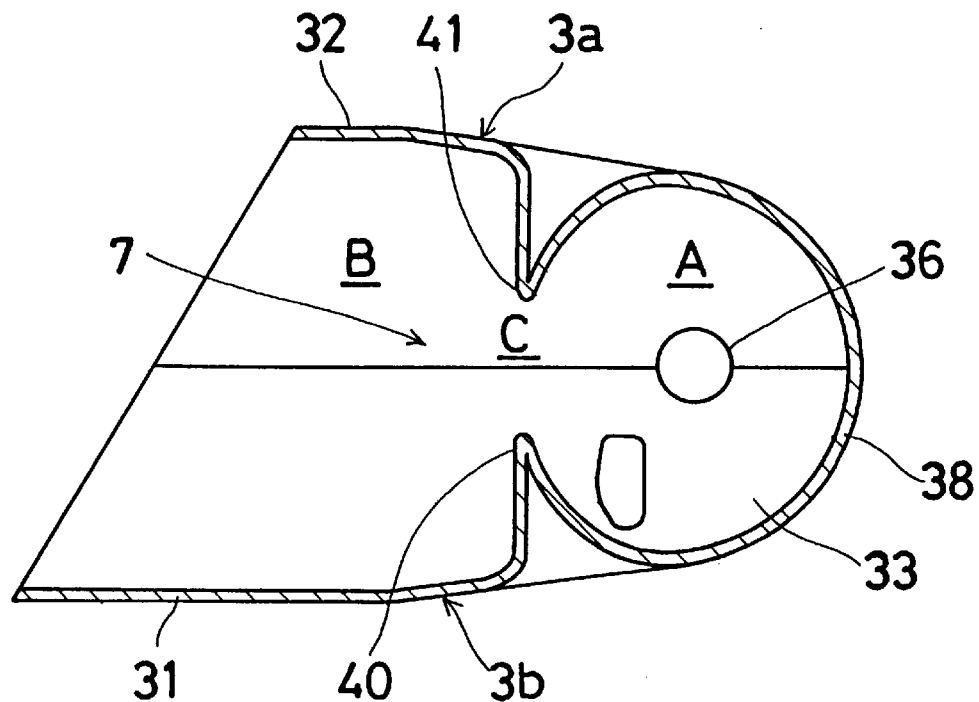
FIG. 3 is a cross-sectional view of the present invention taken along line 3—3 of FIG. 2.
Figure 4:
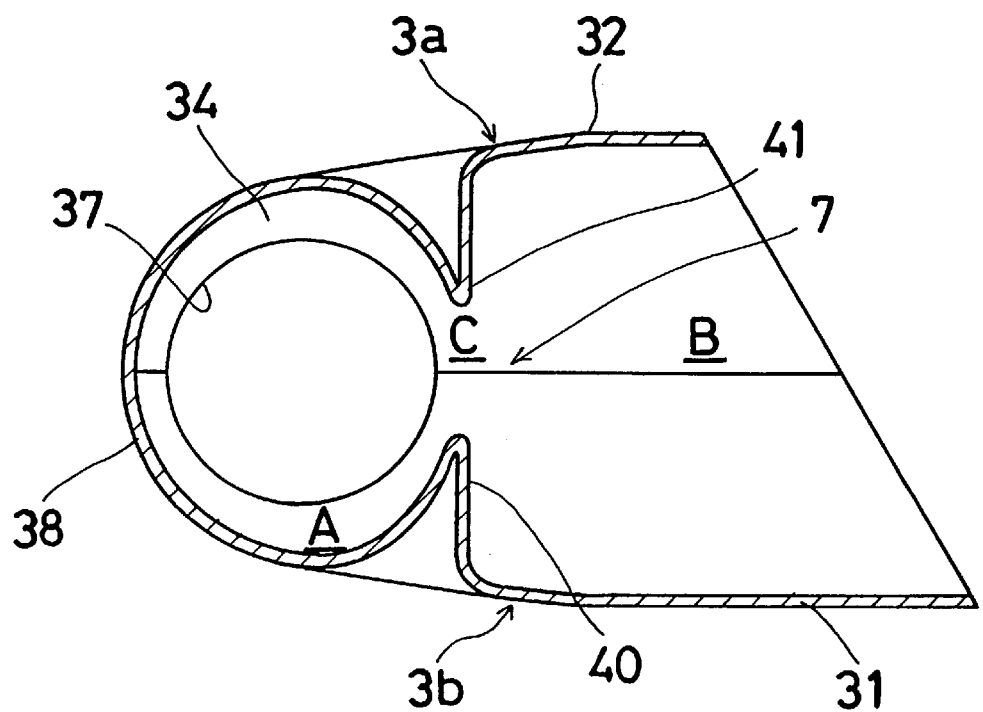
FIG. 4 is a cross-sectional view of the present invention taken along line 4—4 of FIG. 2.

First and second flow control walls 40, 41 control the flow of gas from the inflator 1. The flow control walls 40, 41 are continuously formed on the surface of the lower wall 31 and the upper wall 32, respectively. The lower wall 31 and the upper wall 32 are drawn by a stamping press process. The flow control walls 40, 41 are formed symmetric with respect to the axis X as shown in FIG. 2. The flow control walls 40, 41 are extended towards the inside of the canister housing 3 so as to divide the first and second spaces A and B and face each other so as to form the air path C between the first and second spaces A and B. The extension length of the flow control walls 40, 41 are practically the same. First and second flow control wall edges 40a, 41a comprise parallel portions adjacent to the side wall 33 and inclined portions so that the opening width of the air path C is wider as the distance from side wall 33 increases. The upper canister 3a and the lower canister 3b are connected to each other by welding to keep the canister housing 3 in an air-tight manner. The flow control walls 40, 41 diffuse the flow of the gas from the inflator 1. During the inflation of the air bag 2, the gas is distributed uniformly into the air bag 2. Namely, a pair of the flow control walls 40, 41 and the air path C compose a diffuser portion 7. As shown in FIG. 1, there is disposed a case 6, which accommodates an air pressure adjusting mechanism (not shown), on the surface of the side wall 33.

When a vehicle is involved in a collision, an acceleration signal is generated by an accelerometer. If the value of the acceleration signal exceeds a predetermined value, the inflator 1 is activated. As a result, the gas from the gas emission opening 11 is introduced to the first space A, the air path C and the second space B sequentially. Finally, the gas flows into the air bag 2 from an air bag opening 21 and expands the air bag 2. Adjacent the gas emission opening 11, one portion (the parallel portion) of the air path C is small and the gas flow amount is thereby restrained. On the other hand, the other side of the air path C is defined large. As a result, the gas flow amount inevitably increases. Based on this composition, the gas from the inflator is uniformly introduced into the space B so that the air bag 2 expands uniformly. When the acceleration signal is cancelled, the air in the air bag 2 is released.

The length of the flow control walls 40,41 are determined in accordance with the capacity of the inflator 1. In order to improve the flow of gas, many other shapes of first and second flow control wall edges 40a, 41a can be adopted. For example, one is free to select the inclined value of the flow control walls 40,41. An arch-shaped wall can also be adopted to the present invention.

While the invention has been described in conjunction with one of its preferred embodiments, it should be understood that changes and modifications may be made without departing from the scope and spirit of the appended claims.

What is claimed is:

1. An air bag inflator apparatus comprising:

a canister housing including a first wall, a second wall, a third wall, a fourth wall and a fifth wall, the first wall and the second wall being opposite to each other, and the third wall and the fourth wall being opposite to each other, wherein the first, second, third, fourth and fifth walls define a first space, and the first, second, third and fourth walls define a second space;

an inflator mounted in said first space; and an air bag mounted in said second space, wherein the canister housing further includes first and second flow control portions integrally formed on the first and second walls, respectively, so as to be opposite to each other, said first and second flow control portions defining a diffuser portion between the first and second spaces such that the first space and the second space are connected to each other through said diffuser portion, wherein said first and second flow control portions of said diffuser portion are formed so as to define a small airflow portion and a large airflow portion of said diffuser portion.

2. The air bag inflator apparatus as set forth in claim 1, wherein said inflator has a gas emission opening located at one end of said inflator.

3. An air bag inflator apparatus as set forth in claim 1, wherein said inflator has a gas emission opening that is located adjacent said small airflow portion of said diffuser portion.

4. The air bag inflator apparatus as set forth in claim 1, wherein said first and second flow control portions have been formed by a stamping press process.

* * * * *